US009600679B2

(12) United States Patent
Calero et al.

(10) Patent No.: US 9,600,679 B2
(45) Date of Patent: Mar. 21, 2017

(54) TECHNIQUES FOR RESOURCE OPERATION BASED ON USAGE, SHARING, AND RECOMMENDATIONS WITH MODULAR AUTHENTICATION

(75) Inventors: William Calero, New City, NY (US); Glen Davis, South Jordan, UT (US); Richard Brian Fowler, Lindon, UT (US); Richard Lindstedt, Kungsangen (SE); Umadevi Santhanam, Karnataka (IN); Kalyanasundaram Subramanivan, Karnataka (IN); Krishna Mitter, Karnataka (IN); Kalidas Balakrishnan, Tamil Nadu (IN); Mahabaleshwar Mallappa Asundi, Karnataka (IN); Ramesh Sunder, Karnataka (IN); Nithya Balachandran, Karnataka (IN); Praveen Kumar Sivapuram, Karnataka (IN); Anil Kumar, Karnataka (IN); Mandhakini Subramanian, Tamil Nadu (IN)

(73) Assignee: Micro Focus Software Inc., Wilmington, DE (US)

( * ) Notice: Subject to any disclaimer, the term of this patent is extended or adjusted under 35 U.S.C. 154(b) by 0 days.

(21) Appl. No.: 13/458,369

(22) Filed: Apr. 27, 2012

(65) Prior Publication Data
US 2012/0278873 A1  Nov. 1, 2012

Related U.S. Application Data

(60) Provisional application No. 61/480,935, filed on Apr. 29, 2011.

(51) Int. Cl.
*G06F 7/04* (2006.01)
*G06F 15/16* (2006.01)
(Continued)

(52) U.S. Cl.
CPC ...... *G06F 21/6218* (2013.01); *H04L 63/0884* (2013.01); *G06F 2221/2141* (2013.01); *G06F 2221/2147* (2013.01)

(58) Field of Classification Search
CPC ......... H04L 9/32; G06F 15/16; G06F 15/167; G06F 21/20
(Continued)

(56) References Cited

U.S. PATENT DOCUMENTS 7,567,987 B2   7/2009   Shappell et al.
7,660,809 B2   2/2010   Cortright et al.
(Continued)

OTHER PUBLICATIONS

Sgandurra et al., Sharing Data Through Confidential Clouds: An Architectural Perspective.*

*Primary Examiner* — Eleni Shiferaw
*Assistant Examiner* — Huan V Doan
(74) *Attorney, Agent, or Firm* — Schwegman Lundberg & Woessner, P.A.

(57) ABSTRACT

Techniques for resource operation based on usage, sharing, and recommendations with modular authentication are provided. A resource space is associated with a principal. The resource space comprises resources local to a device of the principal and remote from the device. The resources presented in a merged view within a local file system and operating system of the device. In an embodiment, the device negotiates authentication with an intermediary for access to a legacy service where authentication is performed by the intermediary on behalf of the device, and the intermediary establishes an authentication session between the principal and the legacy service.

10 Claims, 3 Drawing Sheets

(51) Int. Cl.
*G06F 17/30* (2006.01)
*H04L 29/06* (2006.01)
*G06F 21/62* (2013.01)

(58) Field of Classification Search
USPC ........ 1/1; 705/14.65, 65; 709/202, 204, 206, 709/219, 225; 715/752, 769; 726/4, 6, 7
See application file for complete search history.

(56) References Cited

U.S. PATENT DOCUMENTS

| | | | |
|---|---|---|---|
| 7,725,490 B2 | 5/2010 | Hitchen et al. | |
| 7,734,690 B2 | 6/2010 | Moromisato et al. | |
| 8,082,491 B1 * | 12/2011 | Abdelaziz | G06F 9/465 709/201 |
| 2001/0037311 A1 * | 11/2001 | McCoy et al. | 705/65 |
| 2002/0169874 A1 * | 11/2002 | Batson et al. | 709/225 |
| 2003/0115142 A1 * | 6/2003 | Brickell et al. | 705/51 |
| 2004/0158586 A1 | 8/2004 | Tsai | |
| 2005/0256909 A1 * | 11/2005 | Aboulhosn et al. | 707/200 |
| 2006/0004765 A1 * | 1/2006 | Anderson et al. | 707/10 |
| 2006/0053296 A1 * | 3/2006 | Busboom | H04L 63/083 713/182 |
| 2006/0080397 A1 * | 4/2006 | Chene | H04L 67/00 709/213 |
| 2006/0286967 A1 * | 12/2006 | Lee et al. | 455/411 |
| 2007/0033643 A1 * | 2/2007 | Rossi | H04L 63/08 726/10 |
| 2007/0079357 A1 * | 4/2007 | Grinstein | 726/2 |
| 2007/0094279 A1 * | 4/2007 | Mittal | H04L 67/104 |
| 2007/0100834 A1 * | 5/2007 | Landry | G06F 17/30575 |
| 2007/0101409 A1 * | 5/2007 | Palekar | G06F 21/31 726/4 |
| 2007/0130143 A1 * | 6/2007 | Zhang et al. | 707/8 |
| 2007/0199025 A1 * | 8/2007 | Angiolillo | H04N 21/4113 725/47 |
| 2007/0234408 A1 * | 10/2007 | Burch et al. | 726/6 |
| 2008/0052026 A1 * | 2/2008 | Amidon et al. | 702/104 |
| 2008/0052633 A1 * | 2/2008 | Kubo et al. | 715/752 |
| 2008/0235355 A1 * | 9/2008 | Spanier et al. | 709/219 |
| 2009/0006980 A1 * | 1/2009 | Hawley et al. | 715/752 |
| 2009/0024814 A1 * | 1/2009 | Eisler et al. | 711/162 |
| 2009/0031401 A1 * | 1/2009 | Cudich et al. | 726/4 |
| 2009/0221307 A1 * | 9/2009 | Wolak et al. | 455/466 |
| 2009/0265650 A1 * | 10/2009 | Canovai | 715/769 |
| 2010/0070448 A1 * | 3/2010 | Omoigui | 706/47 |
| 2010/0223387 A1 * | 9/2010 | Arnold | H04L 41/26 709/226 |
| 2010/0250867 A1 * | 9/2010 | Bettger et al. | 711/152 |
| 2010/0251345 A1 * | 9/2010 | James | H04L 63/205 |
| 2011/0055329 A1 * | 3/2011 | Abt, Jr. | G06F 17/30893 709/205 |
| 2011/0093344 A1 * | 4/2011 | Burke et al. | 705/14.65 |
| 2011/0099374 A1 * | 4/2011 | Berrange | 713/168 |
| 2011/0265172 A1 * | 10/2011 | Sharma | H04L 63/0884 726/8 |
| 2011/0276637 A1 * | 11/2011 | Thornton et al. | 709/206 |
| 2011/0276706 A1 | 11/2011 | Chéné | |
| 2011/0321129 A1 * | 12/2011 | Kinsel et al. | 726/4 |

\* cited by examiner

TECHNIQUES FOR RESOURCE OPERATION BASED ON USAGE, SHARING, AND RECOMMENDATIONS WITH MODULAR AUTHENTICATION

RELATED APPLICATIONS

The present application is co-pending with, is a non-provisional of, and claims priority to U.S. Provisional Patent Ser. No. 61/480,935 entitled: "File Operation Based on Usage, Sharing, and Recommendations," filed on Apr. 29, 2011; the disclosure of which in its entirety is incorporated by reference herein.

BACKGROUND

Advancements in technology have transformed the way individuals interact with one another and how commerce is conducted. Nowadays, social communication and business can be conducted via mobile devices from virtually any location on the planet at any given moment in time.

In the area of social interactions, individuals Tweet™ text messages to followers in real time when those individuals want to communicate something. Emails, Facebook™ posts, etc. can also be used for real time for communication and collaboration between individuals and enterprises.

In the area of commerce, enterprises and individuals can work from mobile devices to: perform economic transactions, collaborate on a project, and the like via text messages, email, remote application connectively to cloud services, and more.

In fact, the limits on communication and activities that can be performed nearly appear to be unbounded with recent advancements in technology.

Yet, even with all the various advancement in tools and technologies, individuals and enterprises tend to still collaborate on certain types of electronic assets in outdated manners and in manners that are dictated by electronic architectures and existing electronic services. For example, electronic files are often shared and collaborated on based on: where those files are stored, how those files are stored, and what types of native applications were used to initially create and/or distribute the files. Moreover, file collaboration is typically achieved via email attachments, which proliferates the number of file copies that exists on a network and causes collaboration confusion. Another collaboration approach is using a file system where all the users have access to collaborate.

Another issue facing enterprises with the increased technology and its widespread adoption is security. In particular, legacy services provided by an enterprise may completely lack security or use insufficient security based on current enterprise/industry standards. For the most part, trying to integrate newer security procedures into legacy services is cost ineffective for an enterprise and any such integration still maintains a tightly coupled dependency between the rewritten service and the security technology.

SUMMARY

Various embodiments of the invention provide techniques for resource operation based on usage, sharing, and recommendation with modular authentication. Specifically, and in one embodiment a method for resource management and operation is presented.

A resource space is acquired and assigned to a principal; the resource space defining multiple collaboration resources dispersed over a network. Next, an agent on a device of the principal is directed to present an integrated view of the resource space making each collaboration resource appear to be within a local file system for a local operating system of the device. Finally, a particular collaboration resource is transparently and dynamically downloaded to the device, via the agent, for principal access when a particular reference to the particular collaboration resource is activated by the principal.

DETAILED DESCRIPTION

Figure 1:
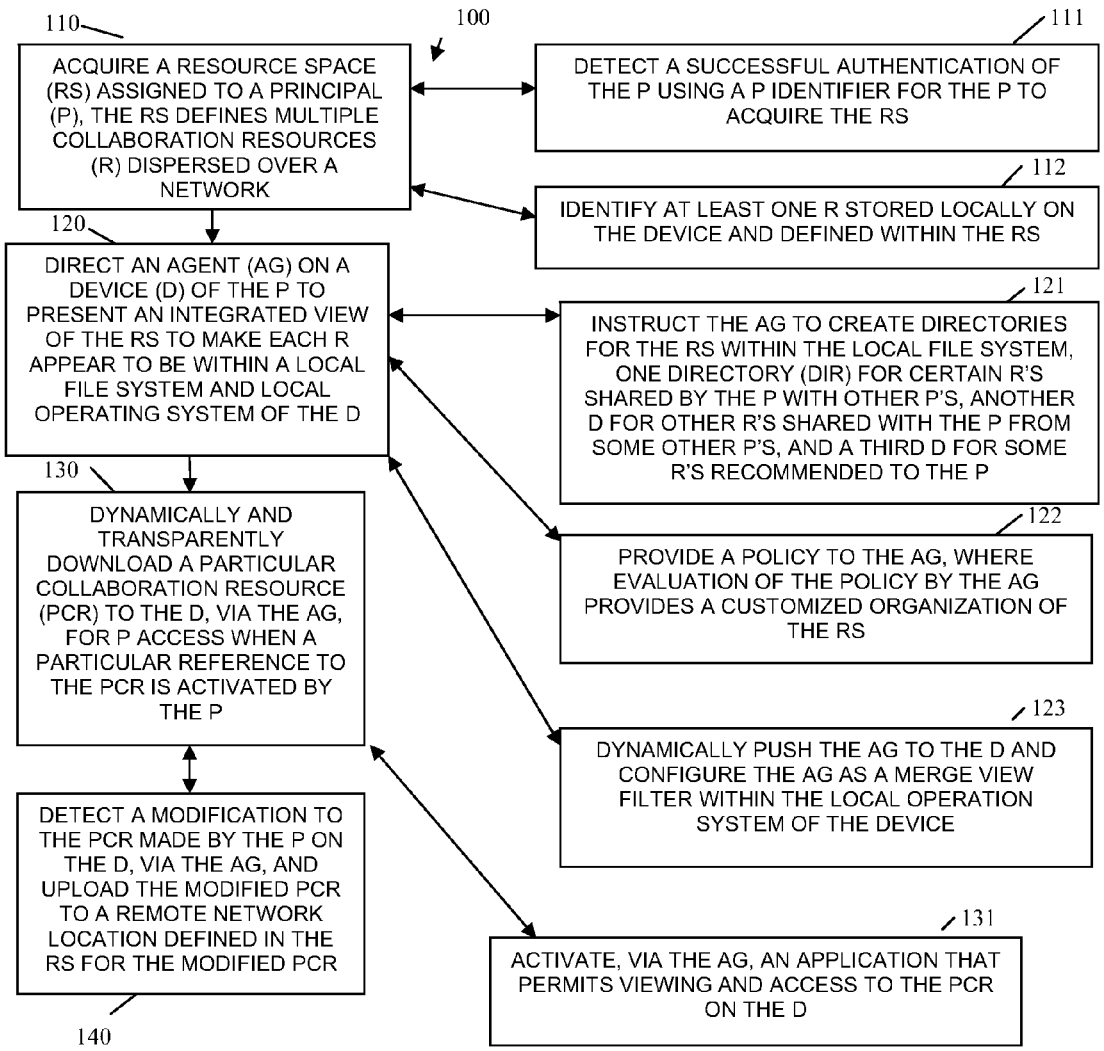
FIG. 1 is a diagram of a method for resource management and operation, according to an example embodiment.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, workload management products, and other products distributed by Novell, Inc.

Also, the techniques presented herein are implemented in machines, such as processor or processor-enabled devices. These machines are configured to specifically perform the processing of the methods and systems presented herein.

Moreover, the methods and systems are implemented and reside within a non-transitory computer-readable storage media or machine-readable storage medium and are processed on the machines (processor and memory enabled devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 2:
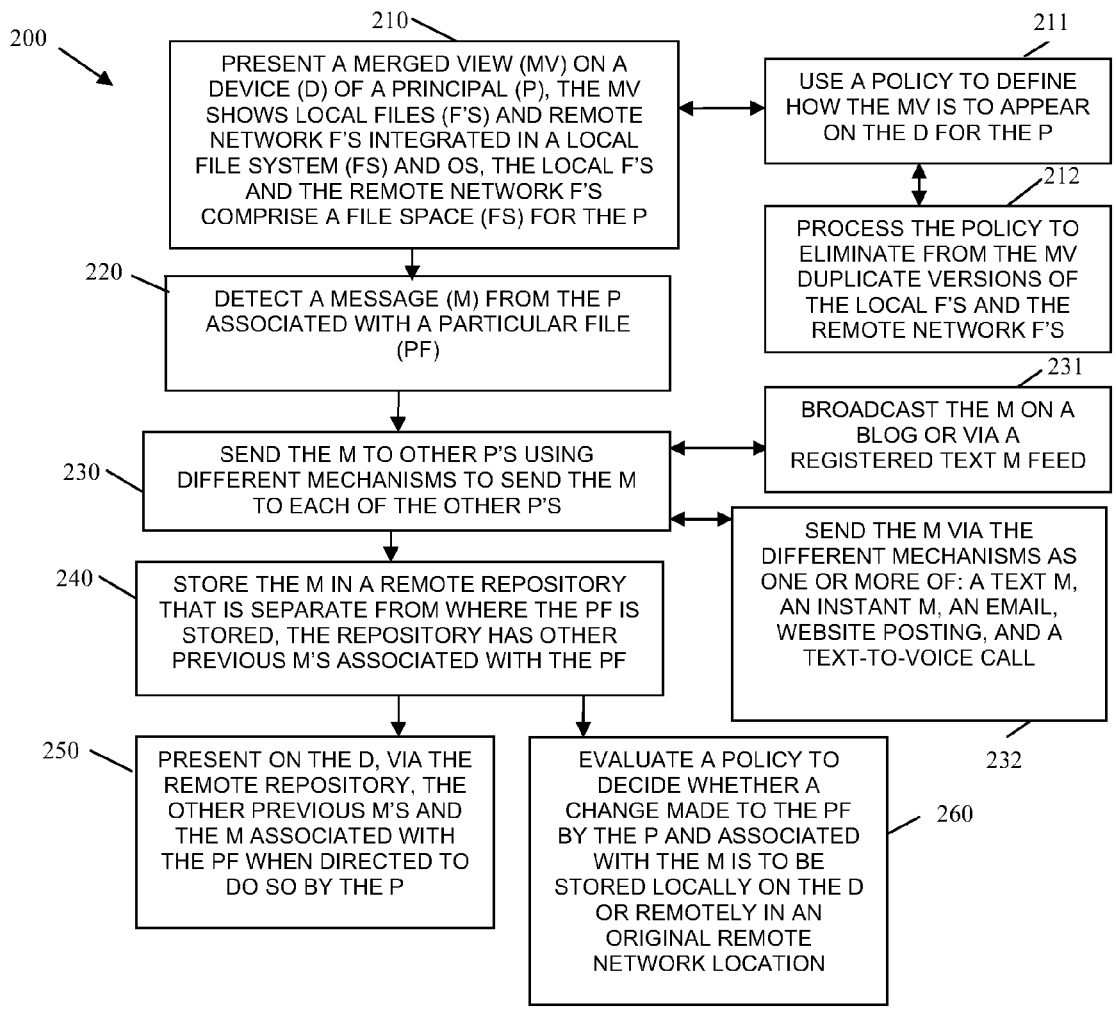
FIG. 2 is a diagram of another method for resource management and operation, according to an example embodiment.
Figure 3:
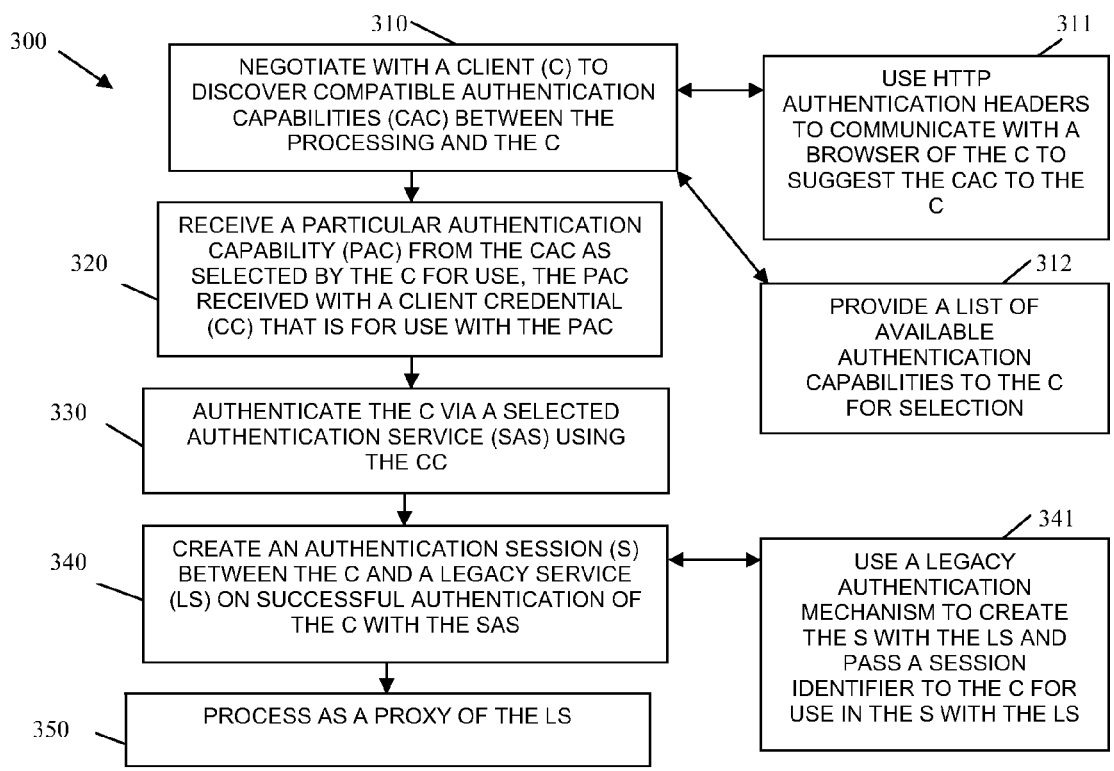
FIG. 3 is a diagram of a method for modular authentication of a resource, according to an example embodiment.

It is within this context that embodiments of the invention are now discussed within the context of the FIGS. 1-3.

FIG. 1 is a diagram of a method 100 for resource management and operation, according to an example embodiment. The method 100 (hereinafter referred to as "resource manager") is implemented within and programmed within a non-transitory computer-readable medium as executable instructions that execute on one or more processing device. Each such processing device specifically configured to process the resource manager. The resource manager is also operational over a network and the network is wired, wireless, or a combination of wired and wireless.

At 100, the resource manager acquires a resource space assigned to a principal. The resource space defines multiple collaboration resources dispersed over a network.

As used herein a "resource space" is a logical organization and view of resources that a user is sharing, it being shared with the user, or is being recommended to the user. A resource can include such things as files, applications, contacts, emails, and the like. The resources do not have to be all stored in a same remote environment, such as a cloud environment; although in some cases they may all be stored in a cloud environment. It is also noted that any particular resource may belong to multiple different resource spaces. In an embodiment, the resource space is metadata that includes resource identifiers for the collaboration resources that comprise the resource space and a network location for acquiring a master version of each resource. It is noted that other information may be carried in the metadata as well, such as version number, owner, last date and time modified, and the like.

A principal (automated service or an end-user) is associated with one or more resource spaces via a principal identifier by the resource manager.

According to an embodiment, at 111, the resource manager detects a successful authentication of the principal using a principal identifier for the principal to locate and acquire the multiple collaboration resources that comprise the resource space.

In one scenario, at 112, the resource manager identifies at least one collaboration resource that is stored locally on the device of the principal (device being used by the principal to acquire the resource space). That at least one collaboration resource is also defined within the resource space.

At 120, the resource manager directs an agent on a device of the principal to present an integrated view of the resource space to make each collaboration resource appear to be within a local file system (FS) and local operating system (OS) of the device. The agent can be pre-existing on the device or can be dynamically installed to the device (as discussed below). The collaboration resources may be organized as directories and files, some of which are remotely mounted based on the OS of the device but the principal (user or automated service) is unaware of this remote mounting because to the principal the integrated view displays the directories and files of the resource space within a single integrated view and/or directory on the FS and OS of the device.

In an embodiment, at 121, the resource manager instructs the agent to create directories for the resource space within the local FS of the device, where: one directory is for certain collaboration resources shared by the principal; another directory is for other collaboration resources shared with the principal from some other principals; and a third directory is for some collaboration resources being recommended to the principal. Recommendations can be made in a variety of manners, such as based on the content of files, which can be used to perform automated searching to locate other files having similar (substantial matches based on scoring and threshold analysis) content. Moreover, recommendations can be triggered by the principal placing a resource (such as a file) in a designated area (such as a search area) or in the recommendation directory. The recommendations can also be automatically triggered by the resource manager based on resources in the resource space and profile settings for the principal.

In another case, at 122, the resource manager provides a policy to the agent, where the agent evaluates that policy to provide a customized organization of the collaboration resources within the integrated view for the resource space. So, an administrator or the principal can customize via a policy how the agent is to present the integrated view of the resource space and how that integrated view is organized.

In one situation, at 123, the resource manager dynamically pushes the agent to the device and configures the agent as a merged view filter mechanism within the local OS of the device. In this situation, the agent traps directory operations to filter local mounts and remote mounts so that the resource space appears as one local directory on the device of the device of the user.

It is also noted that the device can be a laptop, smart phone, tablet, or any processing device, which the principal (user) logs into the resource manager from.

At 130, the resource manager dynamically and transparently downloads a particular collaboration resource to the device, via the agent, for the principal to access when a particular reference to the particular collaboration resource is activated by the principal.

In another situation, at 131, the resource manager activates, via the agent, an application that permits viewing and accessing the particular collaboration resource on the device. So, a native access application for the type of resource (word processing, email, etc.) is activated to provide the principal access to a selected resource within the integrated view of the resource space.

According to an embodiment, at 140, the resource manager detects a modification to the particular collaboration resource, which is made by the principal on the device and using a native application of that resource. The detection is made via the agent and the resource manager uploads the modified particular collaboration resource to a remote network location defined in the resource space for the modified particular collaboration resource. It is noted in some cases, the change is locally stored on the device of the principal and information about the change is communicated for management with the resource space. In some cases, only recently changed resources or certain resources defined by policy are stored on the local device of the principal. As stated before, in other cases it may be that resources are never stored on local devices of the principal (pure cloud based approach).

How and where resources are stored can be configured and/or based on dynamic policy evaluation.

FIG. 2 is a diagram of another method 200 for resource management and operation, according to an example embodiment. The method 200 (hereinafter referred to as "resource collaborator") is implemented within and programmed within a non-transitory computer-readable medium as executable instructions that execute on one or more processing device. Each such processing device specifically configured to process the resource collaborator. The resource collaborator is also operational over a network and the network is wired, wireless, or a combination of wired and wireless.

The resource collaborator presents another and in some ways an enhanced perspective of the resource manager represented by the method 100 and discussed above with reference to the FIG. 1. Specifically, the resource collaborator is presented from the perspective of the agent that processes on a device of a principal that logs into the resource manager discussed above with reference to the FIG. 1. The resource collaborator can be pre-existing on a device of the principal when the principal logs into the resource manager or can be dynamically pushed to and initiated on the device during the log in process by the principal, when the resource collaborator is not already detected on the device of the principal. It is also notated that the resource collaborator shows a specific type of resource that is being collaborated on, to wit, files.

At 210, the resource collaborator presents a merged view on a device of a principal (user or automated service). The merged view shows local files and remote network files integrated in a local file system and local OS. The local files and the remote network files comprise a file space for the principal.

According to an embodiment, at 211, the resource collaborator uses a policy to define how the merged view is to appear on the device for the principal. So, the manner and the organization of the merged view are customizable via the policy.

Continuing with the embodiment of 211 and at 212, the resource collaborator processes the policy to eliminate from the merged view duplicate versions of the local files and the remote network files.

At 220, the resource collaborator detects a message from the principal that is associated with a particular file. This message is customized and associated with the particular file by the principal.

At 230, the resource collaborator sends the message to other principals using different mechanisms to send the message to each of the other principals. Profiles for each of the other principals can be used to determine the specific mechanism that is to be used for that particular principal.

In an embodiment, at 231, the resource collaborator broadcasts the message on a blog or via a registered text message feed. The registered text message feed can be a Twitter™ feed or any other mechanism where multiple recipients receive text messages via a single broadcast.

In another scenario, at 232, the resource collaborator sends the message via different mechanisms as one or more of: a text message, an instant message, an email, a website posting, and/or a text-to-voice automated voice call.

At 240, the resource collaborator stores the message in a remote repository (remote from the device and over a network). The remote repository is separate from where the particular file is stored. Moreover, the remote repository has other previous messages associated with the particular file.

According to an embodiment, at 241, the resource collaborator presents on the device, via the remote repository, the other previous messages and the message associated with the particular file when directed to do so by the principal. So, all messages or an entire timeline of messages (much like a blog) for a particular file can be presented to the principal (user) for consumption.

In another scenario, at 242, the resource collaborator evaluates a policy to decide whether a change made to the particular file by the principal and associated with the message is to be stored locally on the device or remotely in an original remote network location.

FIG. 3 is a diagram of a method 300 for modular authentication of a resource, according to an example embodiment. The method 300 (hereinafter referred to as "resource authentication facilitator") is implemented within and programmed within a non-transitory computer-readable medium as executable instructions that execute on one or more processing device. Each such processing device specifically configured to process the resource authentication facilitator. The resource authentication facilitator is also operational over a network and the network is wired, wireless, or a combination of wired and wireless.

In an embodiment, the resource authentication facilitator provides a mechanism for a first resource, such as a user to authenticate to a managed resource, such as a managed resource described above with respect to the FIGS. 1 and 2.

At 310, the resource collaborator negotiates with a client of a principal to discover compatible authentication capabilities between the resource authentication facilitator and the client. This can occur in a variety of manners.

For example, at 311, the resource authentication facilitator uses Hyper Text Transfer Protocol (HTTP) authentication headers to communicate with a browser of the client to suggest the compatible authentication capabilities to the client.

In another case, at 312, the resource authentication facilitator provides a list of available authentication capabilities to the client for selection.

At 320, the resource authentication facilitator receives a particular authentication capability from the compatible authentication capabilities as selected by the client for use. The particular authentication capability received from the client along with a principal or client credential that is for use with the particular authentication capability.

At 330, the resource authentication facilitator authenticates the client via a selected authentication service using the principal and/or client credential.

At 340, the resource authentication facilitator creates an authentication session between the client and a legacy service on successful authentication of the client with the authentication service.

According to an embodiment, at 341, the resource authentication facilitator uses a legacy authentication mechanism to create the authenticated session with the legacy service and pass a session identifier to the client and/or principal for use in the authenticated session with the legacy service.

In an embodiment, the resource authentication facilitator is processed as a reverse proxy of the legacy service.

The resource authentication facilitator provides a variety of beneficial mechanisms, some of which are more fully described below along with some additional processing scenarios.

The resource authentication facilitator is provided as an authentication service independent of the identity server and authentication protocols. This is a middle layer between the legacy service of an enterprise and the client. The supported authentication protocols can include: LDAP, Kerberos, OpenID, SAML, Twitter™ and Facebook™ authentication APIs, etc. The middle tier authentication service (resource authentication facilitator is modular and can be expanded when support for a new authentication protocol is needed.

An example communication between a client and the resource authentication facilitator is explained as follows:
1. The client negotiates with the resource authentication facilitator to determine the resource authentication facilitator's current authentication capabilities.
2. The resource authentication facilitator responds with a list of its capabilities.
3. The client chooses one of the capabilities that match its own capabilities and then sends the authentication tokens or credentials that are required for the selected authentication capability. The client might be redirected to a third party authentication vendor that uses a protocol like OpenID or SAML.
4. If the client tries to authenticate without any negotiation, the resource authentication facilitator assumes it's a dumb client (like a browser) and start suggesting the authentication mechanism through http www-authenticate headers and the browser can choose an appropriate authentication mechanism from the set of supported authentication mechanisms. The browser might be configured to always choose the strongest authentication mechanism that is supported.
5. Based on the client supplied authentication credentials, the resource authentication facilitator (the middle tier authentication service or NAuth module) figures out which identity server it has to talk to. The client supplied credentials might be (a name and password or other security tokens; these include, but are not limited to: a common name (cn); a distinguished name (dn); a simple name (login id); an email address (OpenID); a URL/URI (OpenID); a plaintext password (Basic or Digest Authentication); a token (Kerberos); an assertion (SAML), etc. a cn or a dn or a login Id, or an openid url).
6. The resource authentication facilitator authenticates against the correct identity server or waits for tokens or assertions from the 3rd party authentication providers.
7. After a successful authentication, the resource authentication facilitator creates a session for a limited period of time (configurable) and returns a SessionID to the client.
8. The client provides the SessionID for any subsequent communications from the client to the service. The resource authentication facilitator is responsible for maintaining the session and returning the session information when requested by client or any other service.
9. As the client finally interacts with the legacy service, for example a file read operation, the legacy service verifies the validity of the SessionID before allowing the client any access to the file.

It is noted that the resource authentication facilitator is not an authorization service. It is only a middle tier between the clients, the legacy services, and the identity providers/authentication services. All authorization decisions are made by the legacy service itself or a policy engine associated with the legacy service. For example, if client C1 wants to access a file F1 at service S1, S1 first uses the resource authentication facilitator to validate that C1 is really C1. At that point the role of the resource authentication facilitator is done. It has no role in determining of C1 is allowed to read or write F1. That authorization decision is made by S1 or by a policy decision point associated with S1. The resource authentication facilitator allows S1 and C1 to interact with each other independent of all of the authentication services that truly own the identities of clients and servers like C1 and S1, but it is not an authorization service.

Services can be made available to users independent of the authentication service or identity provider, which own the identities of those users. In other words, a user can be associated with multiple authentication mechanisms and can be authenticated with any available mechanism at any location with any device all based on a combination of the device capabilities and the end user preferences. The capabilities supported and desired by the client are negotiated with the capabilities offered by the resource authentication facilitator or a module associated with service providers to choose a mechanism, which is appropriate for that use case. The resource authentication facilitator supports all the legacy authentication mechanisms and protocols. It is also modular so that any new authentication mechanism can easily be supported offer new feature above and beyond any of the current authentication technologies.

It is also noted that for FIGS. 1-3, the resources can be across or span different cloud environments and the principal (end user) receives an aggregated view across all remote files (resources) for the end user and the end user's local file system files (resources). This is a merge of files (resources) from different network (remote) files and local files for the user and could also be different authentication mechanisms as well (FIG. 3).

Also, the "shared with the end-user or principal" resources (files) are presented as an inbox of single directory of all files shared with that user. In an embodiment, this could be an inbox of an email system.

There are also no multiple copies of a resource even with external entities that use the resource.

Herein, the data/content/resource becomes the center of operation rather than the collaboration tool or platform being used to collaborate on that data/content/resource. For example, today one sends an email with an attachment of the email with the approaches herein file resides where it natively always has and collaboration happens around that native network location for the file.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:
1. A method implemented in a non-transitory machine-readable storage medium and processed by one or more processors configured to perform the method, comprising:
acquiring a resource space assigned to a principal, the resource space defining multiple collaboration resources dispersed over a network, wherein the resource space is metadata, and the metadata includes: resource identifiers for the collaboration resources, network locations for acquiring a master version of each collaboration resource, version numbers for each collaboration resource, owner information for each collaboration resource, and a last date and time modified for each collaboration resource, and wherein some of the collaboration resources is associated with multiple different resource spaces, and wherein acquiring further includes detecting a successful authentication of the principal and using a principal identifier for the principal to acquire the resource space;

remotely mounting, by a local operating system of a device operated by the principal, at least one of the collaboration resources on the device, and wherein remotely mounting further includes processing the remote mounting by the local operating system in a manner that the principal is unaware of remote mounting for that at least one collaboration resource by the local operating system of the device performing remote mounting from the device to the at least one collaboration resource in a session;

directing an agent on the device of the principal to present an integrated view of the resource space making each collaboration resource appear to be within a local file system for the local operating system of the device, and wherein directing further includes instructing the agent to create directories for the resource space within the local file system, one directory for certain collaboration resources shared by the principal with other principals, another directory for other collaboration resources shared with the principal from some of the other principals, and a third directory for some collaboration resources recommended to the principal, and wherein directing further includes dynamically pushing the agent to the device and configuring the agent as a merge view filter within the local operating system of the device; and dynamically and transparently downloading a particular collaboration resource to the device, via the agent, for principal access when a particular reference to the particular collaboration resource is activated by the principal.

2. The method of claim 1, wherein acquiring further includes identifying at least one collaboration resource stored locally on the device and defined within the resource space.

3. The method of claim 1, wherein directing further includes providing a policy to the agent, evaluation of the policy by the agent providing a customized organization of the resource space.

4. The method of claim 1, wherein dynamically and transparently further includes activating, via the agent, an application that permits viewing and access to the particular collaboration resource on the device.

5. The method of claim 1 further comprising, detecting a modification to the particular collaboration resource made by the principal on the device, via the agent, and uploading the modified particular collaboration resource to a remote network location defined in the resource space for the modified particular collaboration resource.

6. A method implemented in a non-transitory machine-readable storage medium and processed by one or more processors configured to perform the method, comprising:

presenting a merged view on a device of a principal by directing an agent on the device of the principal to generate the merged view showing local files and remote network files integrated together in a local file system for a local operating system, the local files and remote network files comprise a file space defined for the principal, and wherein some of the remote network files associated with multiple different file spaces, wherein presenting further includes using a policy to define how the merged view is to appear on the device for the principal, and wherein presenting further includes processing the policy to eliminate from the merged view duplicate versions of the local files and the remote network files, and wherein presenting further includes detecting a successful authentication of the principal and using a principal identifier for the principal to acquire the file space;

remotely mounting, by the local operating system of a device operated by the principal at least one remote network file on the device, and wherein remotely mounting further processing the remote mounting by the local operating system in a manner that the principal is unaware of the remote mounting by the local operating system of the device performing remote mounting from the device to the at least one remote network file in a session;

detecting a message from the principal associated with a particular file;

sending the message to other principals using different mechanisms to send the message to each of the other principals, profiles for each of the other principals are accessed to determine the specific mechanism that is to be used for a particular principal;

storing the message in a remote repository that is separate from where the particular file is stored, the repository having other previous messages associated with the particular file; and dynamically and transparently downloading a particular collaboration resource to the device, via the agent, for principal access when a particular reference to the particular collaboration resource is activated by the principal.

7. The method of claim 6, wherein sending further includes broadcasting the message on a blog or via a registered text message feed.

8. The method of claim 6, wherein sending further includes sending the message via the different mechanisms as one or more of:

a text message, an instant message, an email, website posting, and a text-to-voice automated voice call.

9. The method of claim 6 further comprising, evaluating a policy to decide whether a change made to the particular file by the principal and associated with the message is to be stored locally on the device or remotely in an original remote network location.

10. The method of claim 6 further comprising, presenting on the device, via the remote repository, the other previous messages and the message associated with the particular file when directed to do so by the principal.

* * * * *